UNITED STATES PATENT OFFICE.

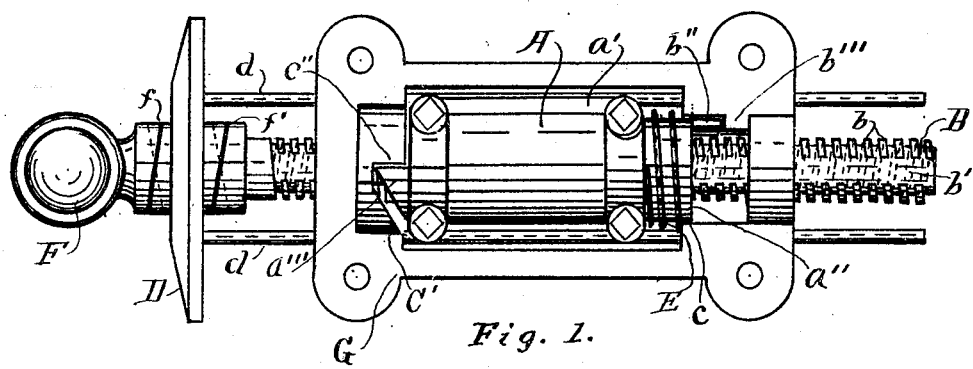

WILLIAM VANMANEN AND STEPHEN VANMANEN, OF GRAND RAPIDS, MICHIGAN.

BENCH-VISE.

No. 804,179.  Specification of Letters Patent.  Patented Nov. 7, 1905.

Application filed November 14, 1904. Serial No. 232,758.

*To all whom it may concern:*

Be it known that we, WILLIAM VANMANEN and STEPHEN VANMANEN, citizens of the United States, residing at Grand Rapids, in the county of Kent and State of Michigan, have invented certain new and useful Improvements in Bench-Vises, of which the following is a specification.

Our invention relates to improvements in quick-acting bench-vises; and its object is to provide a bench-vise having a mutilated screw with which the screw upon the revolving bench-screw will invariably mesh with the screw-thread in the nut. We attain this object by the mechanism illustrated in the accompanying drawings, in which—

Figure 1 is a top plan of a bench screw, vise, and their supporting-casting detached from the bench. Fig. 2 is an end view of the nut and screw, showing the ends of the mutilated threads. Fig. 3 is a plan of the screw, showing the mutilated thread, and Fig. 4 is a bottom plan of the cap of the nut.

Similar letters refer to similar parts throughout the several views.

The nut in this case is made in two parts, the cap A having a narrow line of angling-cogs $a$, which form a short length of regularly-arranged screw-threads of a proper length to allow the open space $b'$ in the screw-threads of the bench-screw B to receive them, so that the bench-screw may be easily slid endwise to quickly adjust the position of the jaw D in its relative position with the support G or the edge of the bench, (not here shown,) so that it may be readily adjusted to any width or size of object to be clamped in the vise.

It is evident that with a square-threaded screw, as shown, an attempt to turn the bench-screw when in connection with the segment of cogs $a$ in the cap would invariably result in locking the screw-threads so that the bench-screw could not be turned, and to obviate this difficulty we have placed the nut A A′ in a yoke or support G in a manner that it may be made to revolve a short distance with the bench-screw and at the same time will be carried forward by reason of the incline $a'''$ traveling upon the incline C′ on the support until the nut is carried to a point where the screw-threads in the nut and on the bench-screw will exactly mesh, when the nut is thrown back to its normal position, as shown in Fig. 1, first, by means of the inclines $b'''$ on the support and $b''$ upon the opposite end of the nut, the nut being actuated by the weight $a'$, which is simply a heavy lug of cast-iron on one side of the portion A′ of the nut, as shown in Figs. 1 and 2, sufficient to carry the nut to its normal position, and, second, by the spring E, that surrounds the bearing $a''$ on the nut and acts at one end upon the end of the bearing $c$ on the support G and at the other end upon the end of the nut, as shown in Fig. 1.

C″ represents a lug or stop on the support G, designed to prevent the nut from being carried beyond its normal position by the weight or the spring hereinbefore described.

$b$ represents the screw-threads on the bench-screw B.

$d$ represents guides for the vise-jaw D, and F is the lever or pin with which the bench-screw B is made to revolve.

We sometimes provide inclines $f\,f'$ between the jaw D and the end of the bench-screw B, which serve a double purpose: first, to assist the inclines C′ $a'''$ to carry the thread upon the bench-screw and in the nut to position to mesh, and, second, to assist the screw and nut in carrying the jaw D forward to firmly clamp any object that may be placed in it, it being understood that after the jaw D has been slid to position to bear upon the object in the vise the screw can be turned but little over one-half way around to clamp the object firmly, and consequently if the object should not be of a solid nature the unassisted travel of the threads might not clamp it sufficiently. Hence the desirability of the auxiliary means as provided by the inclines $f\,f'$ now under discussion.

The incline $b'''$ on the end of the support G is carried out in dotted lines through the screw B, so that it may be easily traced to show its connection with and action upon the incline $b''$ on the end of the bottom A′ of the box or nut A A′.

The bearing $a''$ at the end of the nut A A′ rests and revolves freely in the bearing $c$ on the support G, so that the inclines $b''\,b'''$ may be made to act with certainty, though of course this bearing is not necessary to support the nut, as it is safely supported by the bench-screw B; but it is necessary when the spring E is used to prevent the spring from getting between the ends of the nut and support and fastening it, so that it cannot be properly actuated to adjust the screw-threads, as hereinbefore described.

One of the most essential features of our invention is the short space left between the incline $a'''$ on the nut and the incline $C'$ on the support, which allows the nut to revolve directly around for a short distance before the inclines engage to force it endwise, in which space the screw adjustment seems to be prepared for in a manner not attainable where the endwise movement is imparted from the instant the box begins to revolve.

Having thus fully described our invention, what we claim as new, and desire to secure by Letters Patent of the United States, is—

1. In a quick-acting vise having a stationary and a movable jaw, a bench-screw having a section cut out of the thread longitudinal of the screw, a nut in two parts and having a section of screw-thread longitudinal of one part, and inclines and springs for actuating the nut endwise, substantially as and for the purpose set forth.

2. In a quick-acting vise having a stationary and a movable jaw, a screw having a section cut from the thread longitudinal of the screw, a nut in two parts having a section of screw-thread longitudinal of one part, and inclines, springs and weight for actuating the nut endwise, substantially as and for the purpose set forth.

3. In a quick-acting vise having a movable jaw and a stationary jaw, a screw having a section cut out of the thread longitudinal of the screw, a divided nut having a segment of screw-thread longitudinal of one of its parts, inclines, weights and springs for actuating the nut endwise, and auxiliary inclines on the bench-screw and on the movable vise-jaw, substantially as and for the purpose set forth.

Signed at Grand Rapids, Michigan, January 3, 1904.

WILLIAM VANMANEN.
STEPHEN VANMANEN.

In presence of—
ITHIEL J. CILLEY,
ANDREW ALLGIER.